(12) United States Patent
Ohkubo

(10) Patent No.: US 7,129,960 B2
(45) Date of Patent: Oct. 31, 2006

(54) EDIT TOOL FOR LINE VECTOR DATA

(75) Inventor: Shinichi Ohkubo, Minoo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/109,362

(22) Filed: Apr. 19, 2005

(65) Prior Publication Data

US 2005/0231531 A1    Oct. 20, 2005

(30) Foreign Application Priority Data

Apr. 20, 2004    (JP) ............................. 2004-124597

(51) Int. Cl.
G09G 5/00    (2006.01)
(52) U.S. Cl. ...................................... 345/619
(58) Field of Classification Search ................. 345/619
See application file for complete search history.

(56) References Cited

U.S. PATENT DOCUMENTS

| | | | | |
|---|---|---|---|---|
| 4,739,317 | A * | 4/1988 | Berry et al. ................. | 345/441 |
| 5,623,583 | A * | 4/1997 | Nishino ....................... | 345/420 |
| 5,815,685 | A * | 9/1998 | Kamon ......................... | 716/21 |
| 6,191,796 | B1 * | 2/2001 | Tarr ........................... | 345/581 |
| 6,459,439 | B1 * | 10/2002 | Ahlquist et al. ............ | 345/672 |
| 6,697,078 | B1 * | 2/2004 | Becker et al. .............. | 345/589 |
| 2004/0227760 | A1 * | 11/2004 | Anderson et al. ........... | 345/473 |

FOREIGN PATENT DOCUMENTS

JP    5-108786 A2    4/1993
JP    06259507 A *    9/1994

OTHER PUBLICATIONS

IBM, "Adding a Joint Into a Graphic Object", NB85036055, Mar. 1985.*
James et al., "Accurate Real time Deformable Objects", SIGGRAPH 99, 1999.*
Tescherner et al., "A Versatile and Robust Model for Geometrically Complex Deformable Solids", Computer Graphics Laboratory.*

* cited by examiner

Primary Examiner—Ulka Chauhan
Assistant Examiner—Jeffrey J Chow
(74) Attorney, Agent, or Firm—John R. Pivnichny

(57) ABSTRACT

The invention is devised to facilitate the editing of a graphic displayed on a screen. An editing device includes: an edit object display unit for displaying on a screen a graphic to be edited which includes at least one line graphic defined as a line segment extending from a first end point to a second end point; an edit graphic display unit for displaying on the screen an edit graphic for editing the line graphic; an edit graphic moving unit for moving the edit graphic on the screen in accordance with a user operation; an edit graphic moving unit for moving the edit graphic on the screen in accordance with a user operation; an edit object dividing unit for dividing, in response that the edit graphic contacts a line graphic, the line graphic by generating an end point at a contact point; and an edit object moving unit for moving, in response that the edit graphic is further moved in a direction of a line graphic which contacts the edit graphic, an end point of the line graphic, which contacts the edit graphic in accordance with the movement of the edit graphic.

1 Claim, 16 Drawing Sheets

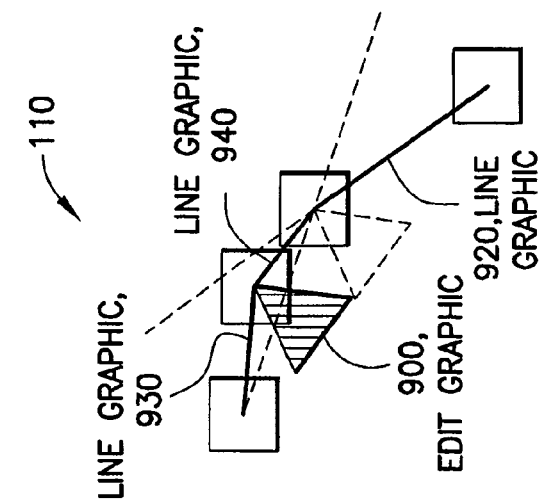
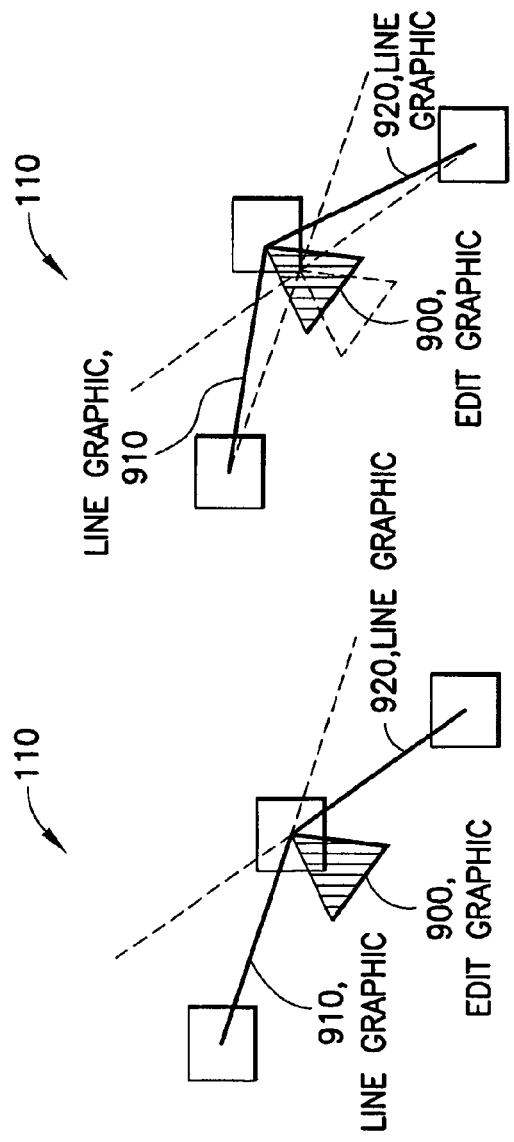

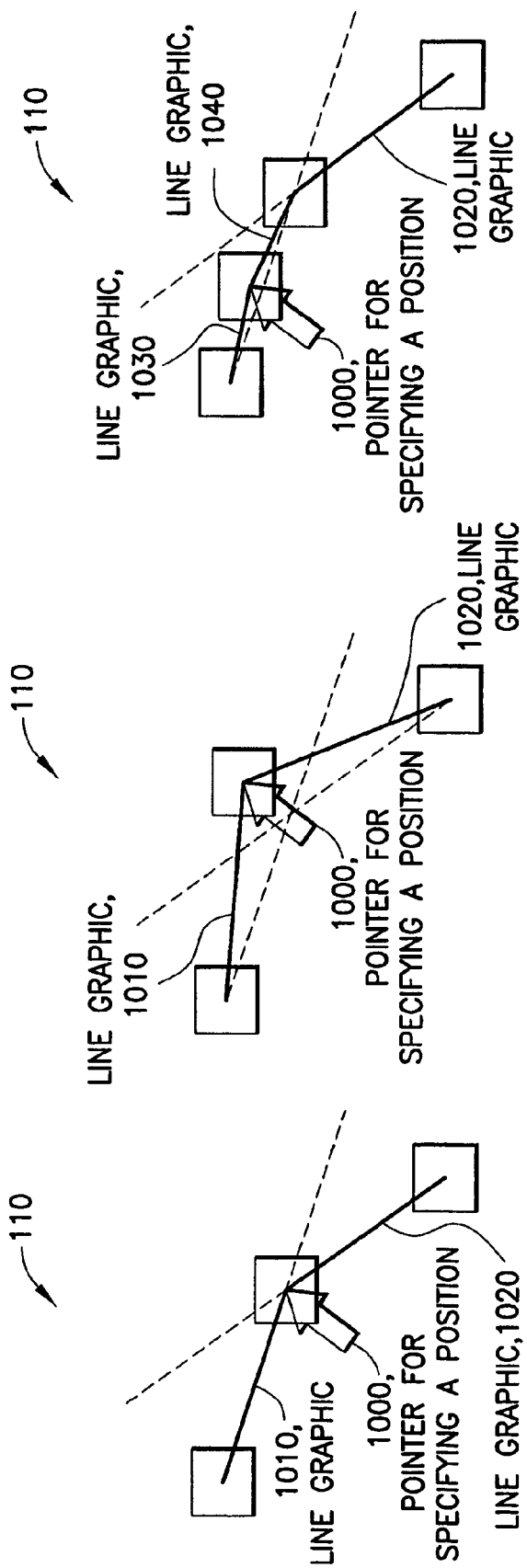

EDIT TOOL FOR LINE VECTOR DATA

FIELD OF THE INVENTION

The present invention relates to an editing apparatus, editing method, program and recording media, and more particularly to an editing apparatus, editing method, program and recording media for editing a graphic displayed on a screen.

BACKGROUND ART OF THE INVENTION

In recent years, the editing of image, graphic or the like by a computer is conducted in various fields. For example, in a Geographic Information System (GIS) and the like, a graphic such as a polyline and a polygon is represented by a vector data. In order to move a linear graphic represented by a vector data, a user clicks the mouse on a vertex of the graphic and drags the mouse to move the graphic. On the other hand, in order to edit a vector data, a user adds a new vertex to a side of the graphic and moves the vertex. If a user specifies a vertex and opens a pop-up menu or the like to select a command to eliminate the vertex, the unnecessary vertex can be eliminated.

As another method for editing a graphic, there has been disclosed in Japanese Published Unexamined Patent Application No. 5-108786 a method in which a line segment to be edited on a screen is made to overlap with a polygon for editing the line segment, thereby transforming that part of the line segment which overlaps the polygon into the shape of the periphery of the polygon.

SUMMARY OF THE INVENTION

According to the conventional method for editing vector data, however, as the number of vertexes included in a graphic to be edited increases, a larger number of operations by the mouse, etc., are required. More specifically, in order to change a positional relation among vertexes, a user must operate the mouse for each vertex. In addition, in order to generate or eliminate a vertex, a command must be issued for each vertex. Consequently, operations for editing a line segment to generate a polyline or changing the position of each vertex of a polygon are difficult to perform.

According to the method of in Japanese Published Unexamined Patent Application No. 5-108786, when the periphery of a polygon contacts two points on a line segment to be edited, there exist two routes along the periphery of the polygon, which connect the two points. Thus, a user must specify which route to employ to transform the line segment. Consequently, an extra operation in addition to an operation of moving the polygon is needed, making the operation complex.

Accordingly, an object of the present invention is to provide an editing apparatus, editing method, program and recording media, whereby the problem described above can be solved. The object is achieved by a combination of the characteristics according to the independent claims. In addition, the dependent claims provide further useful embodiments of the present invention.

In order to solve the problem described above, according to a first aspect of the invention, there are provided an editing apparatus for editing a displayed graphic which includes: an edit object display unit for displaying on a screen a graphic to be edited which includes at least one line graphic defined as a line segment extending from a first end point to a second end point; an edit graphic display unit for displaying on the screen an edit graphic used for editing the line graphic; an edit graphic moving unit for moving the edit graphic on the screen in accordance with a user operation; an edit object dividing unit for dividing, in response that the edit graphic contacts a line graphic, the line graphic by generating an end point at a contact point; and an edit object moving unit for moving, in response that the edit graphic is further moved in a direction of a line graphic which contacts the edit graphic, an end point of the line graphic, which contacts the edit graphic in accordance with the movement of the edit graphic, an editing method using the editing apparatus, a program enabling a computer to function as the editing apparatus and a recording media in which the program is recorded.

When the editing graphic is moved from one side toward a line graphic connecting a first end point to a second end point, the line graphic dividing unit of the invention may divide the line graphic to be edited into a plurality of line graphics having as the vertexes thereof the first and second end points and a plurality of vertexes of the edit graphic which crosses the line graphic while moving.

According to a second aspect of the invention, there are provided an editing apparatus for editing a displayed graphic, including: an edit object display unit for displaying on a screen a graphic to be edited which includes at least one line graphic defined as a line segment extending from a first end point to a second end point; an edit graphic display unit for displaying a pointer for specifying a position on the screen as an edit graphic used for dividing the line graphic into a plurality of line graphics; an edit graphic moving unit for moving on the screen the pointer in accordance with a user operation; an edit object dividing unit for dividing, in response that the pointer is moved in a direction such that the pointer crosses only one of line graphics obtained by extending the two line graphics, the line graphic crossed by the pointer into a line graphic connecting the first end point of the line graphic to a point specified by the pointer and a line graphic connecting the second end point of the line graphic to a point specified by the pointer, on condition that the pointer specifies an end point shared by two line graphics; and an edit object moving unit for moving, in response that the pointer is moved in a direction such that the pointer crosses both of line graphics obtained by extending the two line graphics, the end point shared by the two line graphics in accordance with the movement of the pointer, on condition that the pointer specifies an end point shared by two line graphics, an editing method using the editing apparatus, a program enabling a computer to function as the editing apparatus and a recording media in which the program is recorded.

BRIEF DESCRIPTION OF THE DRAWINGS

FIG. 9 shows an example of a graph displayed on a display device 110 (Example 8).

FIG. 10 shows an example of a graph displayed on a display device 110 (Example 9).

DETAILED DESCRIPTION OF THE PREFERRED EMBODIMENT

The present invention will be described below by reference to embodiments of the invention. However, the embodiments described below are not ones to limit the invention according to the claims. All of combinations of the characteristics described in the embodiments are not necessarily indispensable for the means of solving the problem according to the invention.

Figure 1:
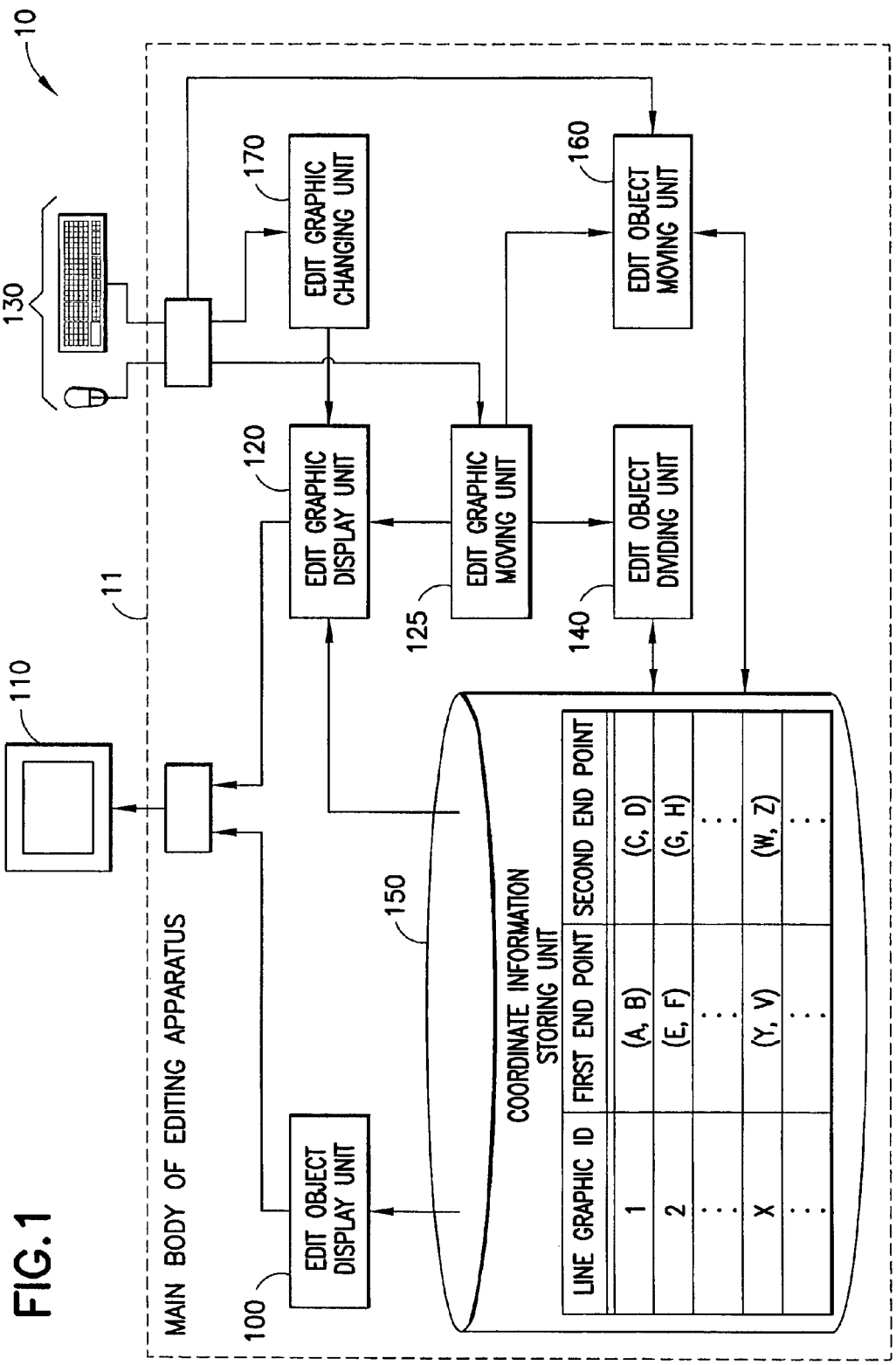
FIG. 1 is a block diagram of an editing apparatus 10.

FIG. 1 is a block diagram of an editing apparatus 10. An object of the editing apparatus 10 is to edit a graphic displayed on a screen of a display device. The editing apparatus 10 includes a main body of the editing apparatus 11 (a personal computer, etc. for example), a display device 110 (a liquid crystal display device, etc. for example) and an operation device 130 (a keyboard & mouse, etc. for example). The main body of the editing apparatus 11 includes an edit object display unit 100, an edit graphic display unit 120, an edit graphic moving unit 125, an edit object dividing unit 140, a coordinate information storing unit 150, an edit object moving unit 160 and an edit graphic changing unit 170.

The edit object display unit 100 displays as an edit object a line graphic defined as a line segment extending from a first end point to a second end point on a screen of the display device 110. For example, the edit object display unit 100 may acquire the coordinates of end points of a line graphic from the coordinate information storing unit 150 to display the end points at the coordinates. Herein, the line graphic refers to a linear graphic whose drawing position is defined by the first and second end points. The line graphic may be a straight line or a curved line, and may be a dotted line or a thick line.

The edit graphic display unit 120 displays an edit graphic having a shape composed of line segments as an edit graphic for dividing a displayed line graphic into a plurality of line graphics on the screen of the display device 110. When the operation device 130 is operated by a user, the edit graphic moving unit 125 moves the edit graphic on the screen of the display device 110 according to the user operation, and sends information such as the direction and amount of movement to the edit object dividing unit 140 and edit object moving unit 160.

In addition, the edit graphic display unit 120 may change the size and shape of the edit graphic displayed on the display device 110 according to an instruction from the edit graphic changing unit 170. Furthermore, the edit graphic display unit 120 may display at least one portion of a graphic to be edited as a new edit graphic according to information acquired from the coordinate information storing unit 150. The edit graphic may be a graphic having a given area (a polygon, a circle or an oval, for example), or a graphic having only a length (a straight line or a curved line, for example).

The edit object dividing unit 140 generates, in response that the edit graphic contacts a line graphic, an end point at the contact point to divide the line graphic. Specifically, whenever the edit graphic contacts a line graphic, the edit object dividing unit 140 divides the line graphic contacting the edit graphic into a new line graphic connecting a first end point of the line graphic to the contact point on the line graphic and a new line graphic connecting the contact point to a second end point of the line graphic. Consequently, when the edit graphic contacts the above line graphic at a plurality of points, the edit object dividing unit 140 divides the line graphic to be edited into a line graphic connecting the first end point to a contact point adjacent to the first end point, at least one line graphic connecting two contact points and a line graphic connecting another contact point to the second end point.

As an operational example, when dividing a line graphic to be edited into two line graphics by use of a contact point with the edit graphic, the edit object dividing unit 140 stores the coordinate of the first end point of the line graphic to be edited and the coordinate of the contact point with respect to one of the two line graphics obtained by dividing the line graphic to be edited into the coordinate information storing unit 150, and stores the coordinate of the second end point of the line graphic to be edited and the coordinate of the contact point with respect to another of the two line graphics obtained by dividing the line graphic to be edited into the coordinate information storing unit 150.

The coordinate information storing unit 150 stores the coordinates of the first and second end points as a vector data for each line graphic to be edited. When the edit graphic is further moved in a direction of a line graphic contacting the edit graphic, the edit object moving unit 160 moves an end point of the line graphic, which contacts the edit graphic in accordance with the movement of the edit graphic, and stores the coordinate of the moved end point into the coordinate information storing unit 150.

The edit graphic changing unit 170 changes the size or shape of the edit graphic according to a user operation and causes the edit graphic display unit 120 to display the edit graphic. For example, in the edit graphic changing unit 170, the reduction ratio or the magnification ratio of the edit graphic may be set, or the rotation angle of the edit graphic may be set.

Figure 2:
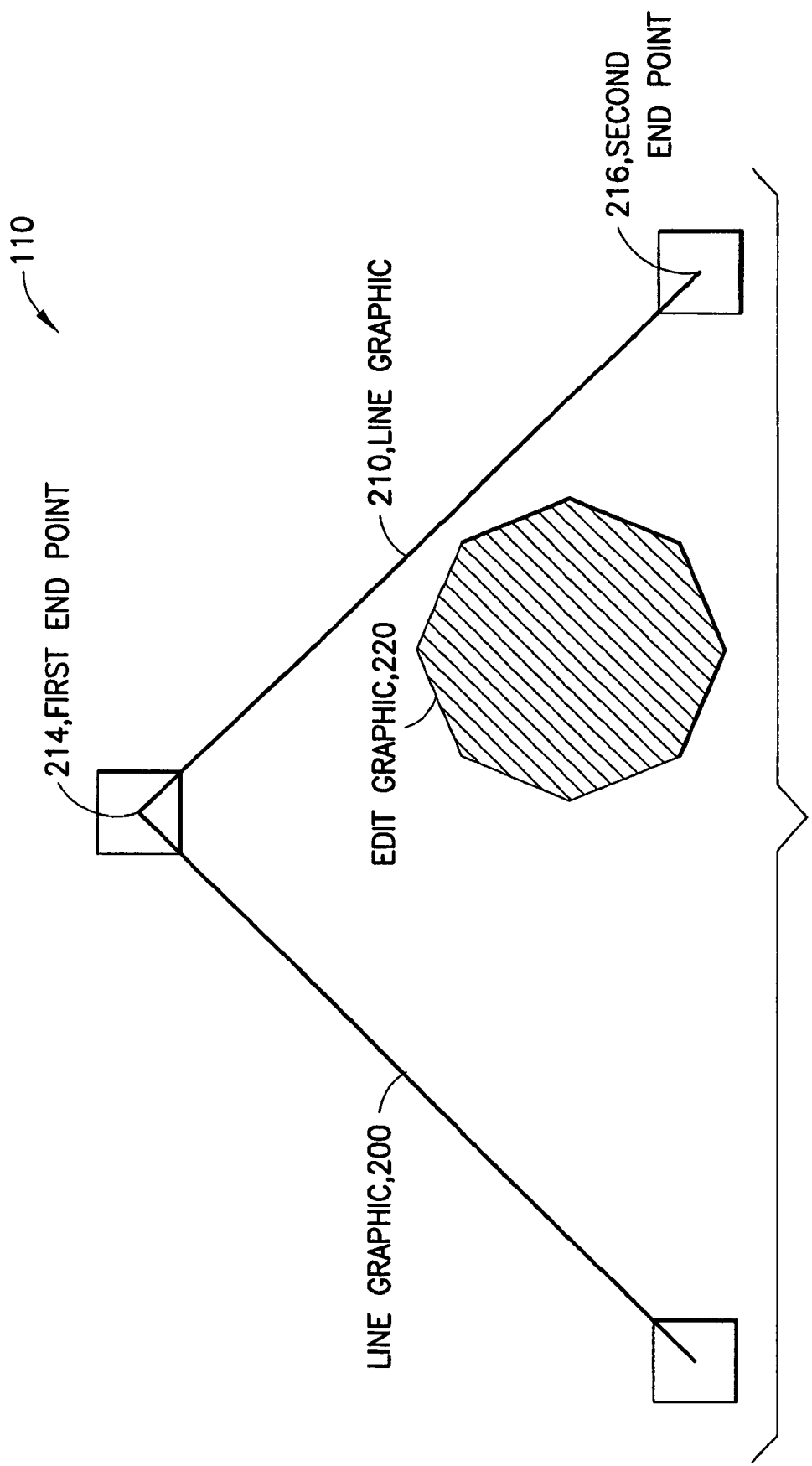
FIG. 2 shows an example of a graph displayed on a display device 110 (Example 1).

FIG. 2 shows an example of a graphic displayed on the display device 110 (Example 1). The edit object display unit 100 displays line graphics 200 and 210 as a graphic to be edited on the display device 110. The line graphic 210 has a first end point 214 and a second end point 216. The edit graphic display unit 120 displays a polygon (an octagon, for example) as an edit graphic 220 on the display device 110. Referring to the drawing, a rectangle around each end point is a marker for clearly indicating the position of each end point.

Figure 3:
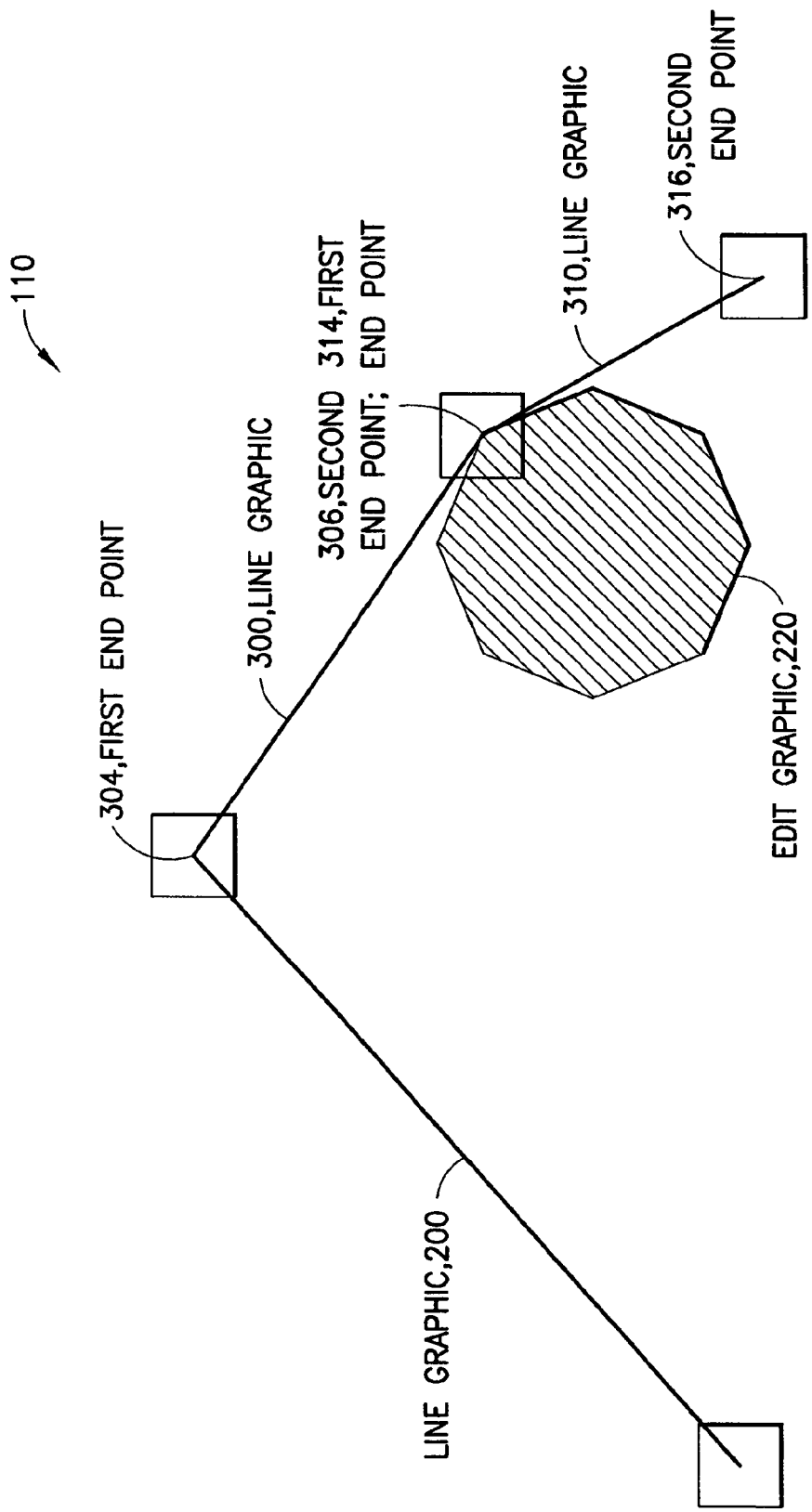
FIG. 3 shows an example of a graph displayed on a display device 110 (Example 2).

FIG. 3 shows an example of a graphic displayed on the display device 110 (Example 2). When a moved edit graphic 220 contacts a line graphic 210 at one vertex of the edit graphic, the edit object dividing unit 140 divides the line graphic 210 into a line graphic 300 connecting a first end point 214 to the contact point contacting the vertex and a line graphic 310 connecting the contact point to a second end point 216. The line graphic 300 has a first end point 304 and a second end point 306. The line graphic 310 has a first end point 314 and a second end point 316.

In this case, a description that an edit graphic 220 contacts a line graphic means that the coordinate of any portion of the edit graphic becomes identical to the coordinate of any portion of the line graphic. Alternatively, the description may mean that a pixel representing any portion of the edit graphic is adjacent to a pixel representing any portion of the line graphic. As still another example, the description may mean that the distance between the coordinate of a pixel representing any portion of the edit graphic and the coordinate of a pixel representing any portion of the line graphic becomes smaller than a predetermined reference value.

When the edit graphic 220 is further moved in a direction of the line graphics 300 and 310, the edit object moving unit 160 moves the second end point 306 and first end point 314 contacting a vertex of the edit graphic 220 according to the movement t of the edit graphic 220.More specifically, the edit object moving unit 160 moves the second end point 306 and first end point 314 in a direction the same as that of the movement of edit graphic 220 by an amount of movement the same as that of the edit graphic 220.

Figure 4:
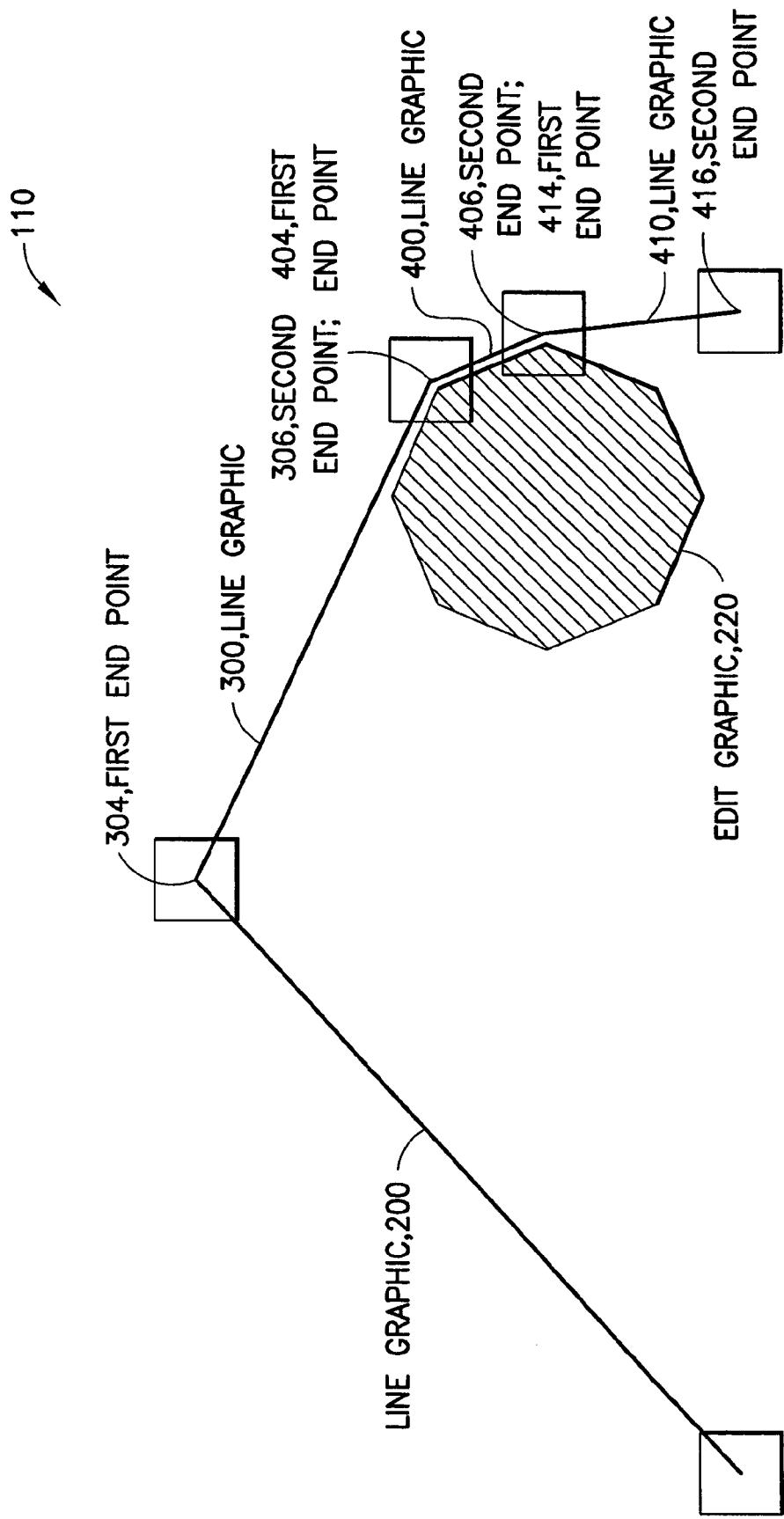
FIG. 4 shows an example of a graph displayed on a display device 110 (Example 3).

FIG. 4 shows an example of a graphic displayed on the display device 110 (Example 3). When the moved edit graphic 220 contacts the line graphic 310 at another vertex, the edit object dividing unit 140 divides the line graphic 310 into a line graphic 400 connecting the first end point 314 to the contact point contacting the vertex and a line graphic 410 connecting the contact point to the second end point 316. The line graphic 400 has a first end point 404 and a second end point 406. The line graphic 410 has a first end point 414 and a second end point 416.

When the edit graphic 220 is further moved in a direction of the line graphics 400 and 410, the edit object moving unit 160 moves the second end point 406 and first end point 414 contacting a vertex of the edit graphic 220 according to the movement of the edit graphic 220. Similarly, the edit object moving unit 160 moves the second end point 306 and first end point 404 according to the movement of the edit graphic 220.

In this way, when two adjacent vertexes of the polygon contacts the line graphic 210, the edit object dividing unit 140 divides the line graphic 210 into a line graphic 300 connecting the first end point to a contact point of one of the vertexes, a line graphic 400 which is a line segment equivalent to a side between the two vertexes and a line graphic 410 connecting a contact point of another vertex to the second end point. Accordingly, the line graphic to be edited can be transformed into a shape along the periphery of the polygon.

Figure 5:
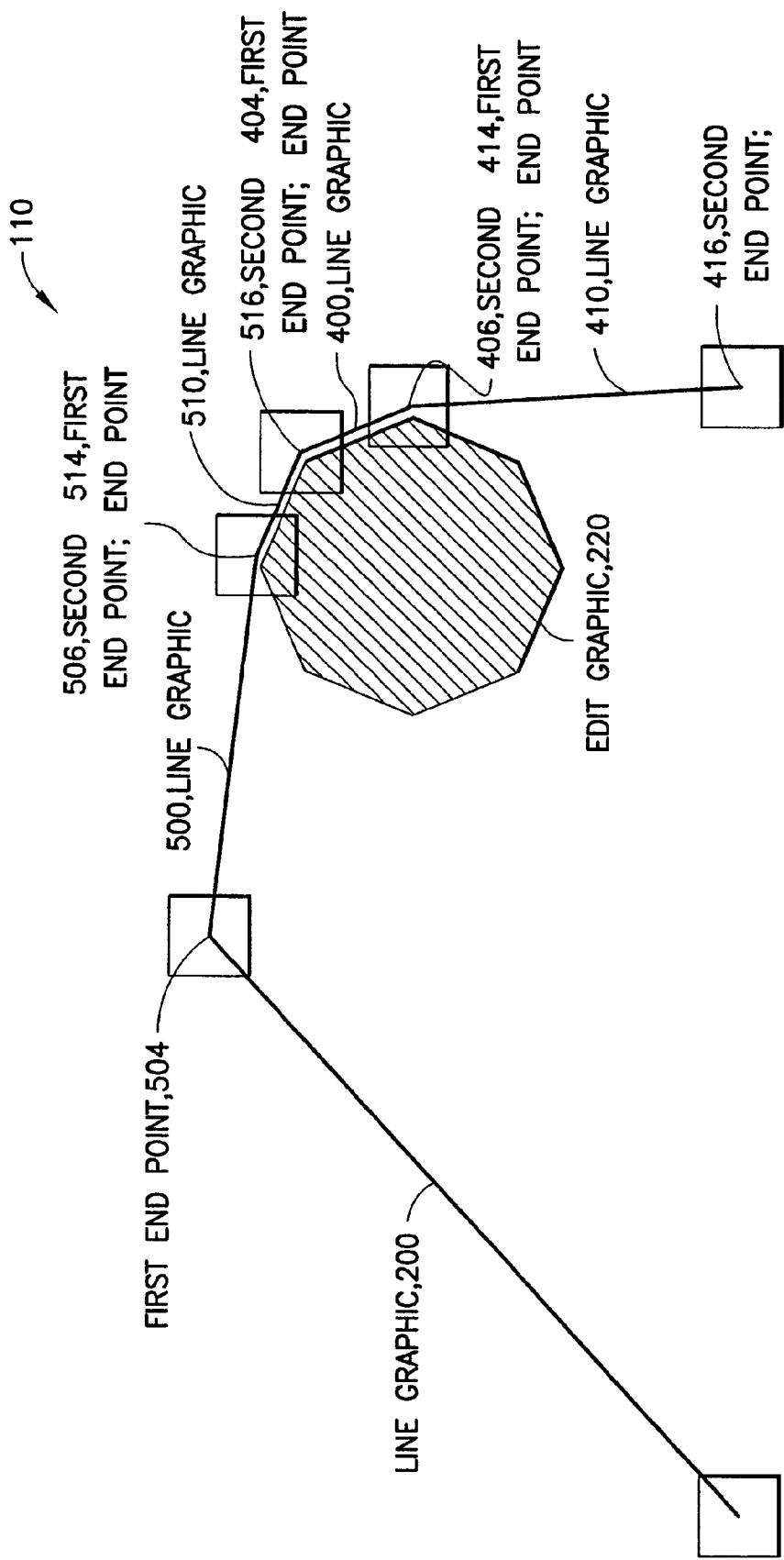
FIG. 5 shows an example of a graph displayed on a display device 110 (Example 4).

FIG. 5 shows an example of a graphic displayed on the display device 110 (Example 4). When the moved edit graphic 220 contacts the line graphic 300 at still another vertex of the edit graphic, the edit object dividing unit 140 divides the line graphic 300 into a line graphic 500 connecting the first end point 304 to a contact point contacting the vertex and a line graphic 510 connecting the contact point to the second end point 306. The line graphic 500 has a first end point 504 and a second end point 506. The line graphic 510 has a first end point 514 and a second end point 516.

When the edit graphic 220 is further moved in a direction of the line graphics 500 and 510, the edit object moving unit 160 moves the second end point 506 and first end point 514 contacting the vertex of the edit graphic 220 according to the movement of the edit graphic 220. Similarly, the edit object moving unit 160 moves the second end point 516, the first end point 404, the second end point 406 and the first end point 414 according to the movement of the edit graphic 220.

As shown above in FIGS. 2 to 5, whenever a vertex of the edit graphic 220 contacts a line graphic, the edit object dividing unit 140 divides the line graphic contacting the vertex into a line graphic connecting a first end point of the line graphic to a contact point of the line graphic, which contacts the vertex, and a line graphic connecting the vertex to a second end point of the line graphic. Accordingly, the edit object dividing unit 140 divides the line graphic to be edited into a line graphic connecting the first end point to a contact point of a vertex of the polygon, line graphics each connecting two contact points with respect to each vertex of the polygon and a line graphic connecting a contact point of a vertex of the polygon to the second end point.

Figure 6:
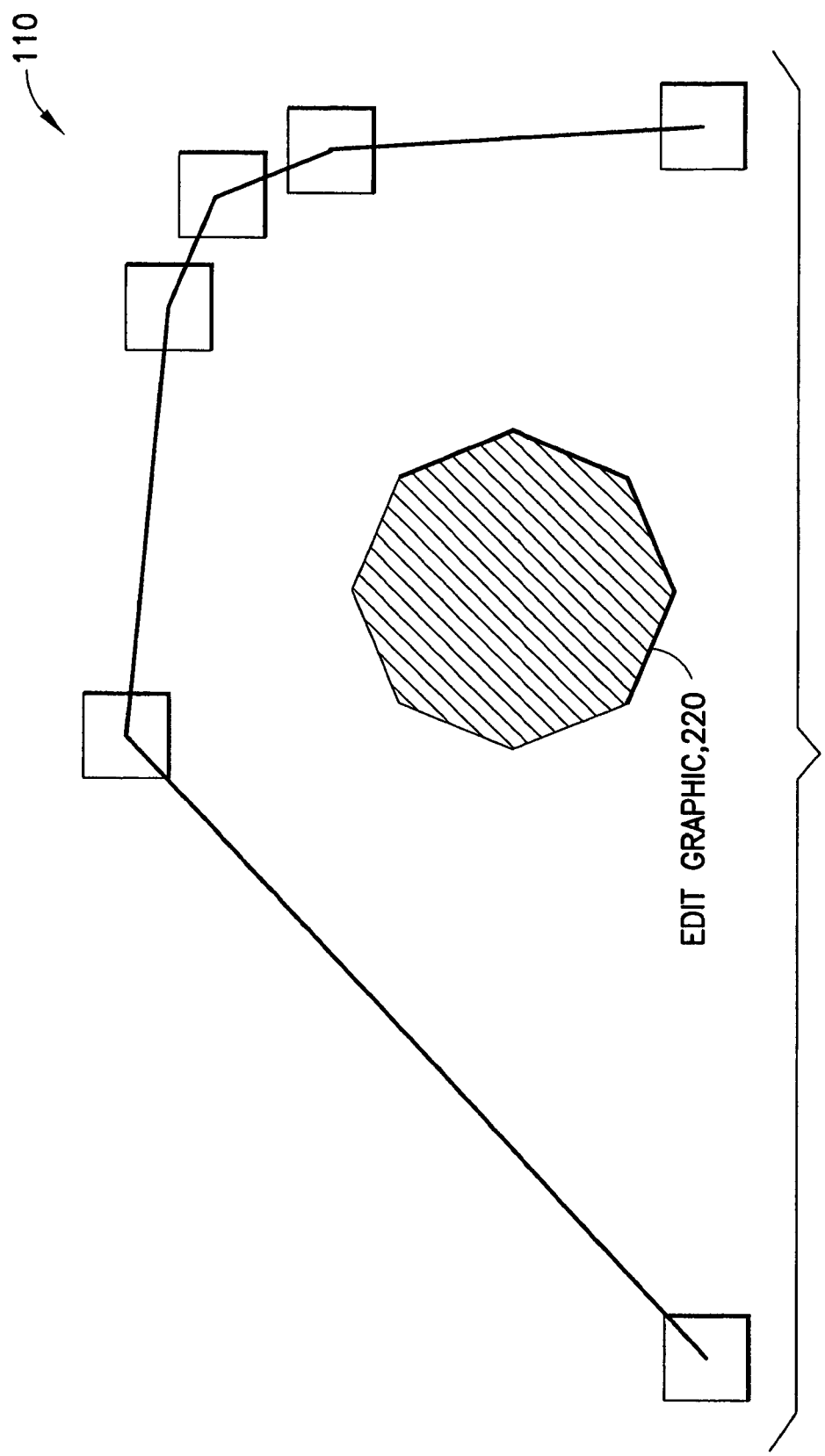
FIG. 6 shows an example of a graph displayed on a display device 110 (Example 5).

FIG. 6 shows an example of a graphic displayed on the display device 110 (Example 5). When the edit graphic 220 is moved in a direction such that the edit graphic 220 is away from a line graphic which contacts the edit graphic 220, the edit object moving unit 160 does not move an end point of the line graphic, which contacts the edit graphic 220 in accordance with the movement of the edit graphic 220. Specifically, the edit object moving unit 160 holds the end point to a position where the end point contacts the edit graphic 220. Accordingly, a wrong operation can be avoided in which an edited line graphic is transformed by mistake.

Alternatively, even when the edit graphic 220 is moved in a direction such that the edit graphic 220 is away from a line graphic which contacts the edit graphic 220, the edit object moving unit 160 may move an end point of the line graphic, which contacts the edit graphic 220 in accordance with the movement of the edit graphic 220. In this case, the edit object moving unit 160 may hold, in response to an instruction to hold the end point, the end point without moving the end point in accordance with the movement of the edit graphic 220. Accordingly, it is possible to make a fine adjustment to the position of a line graphic while moving the edit graphic.

Figure 7:
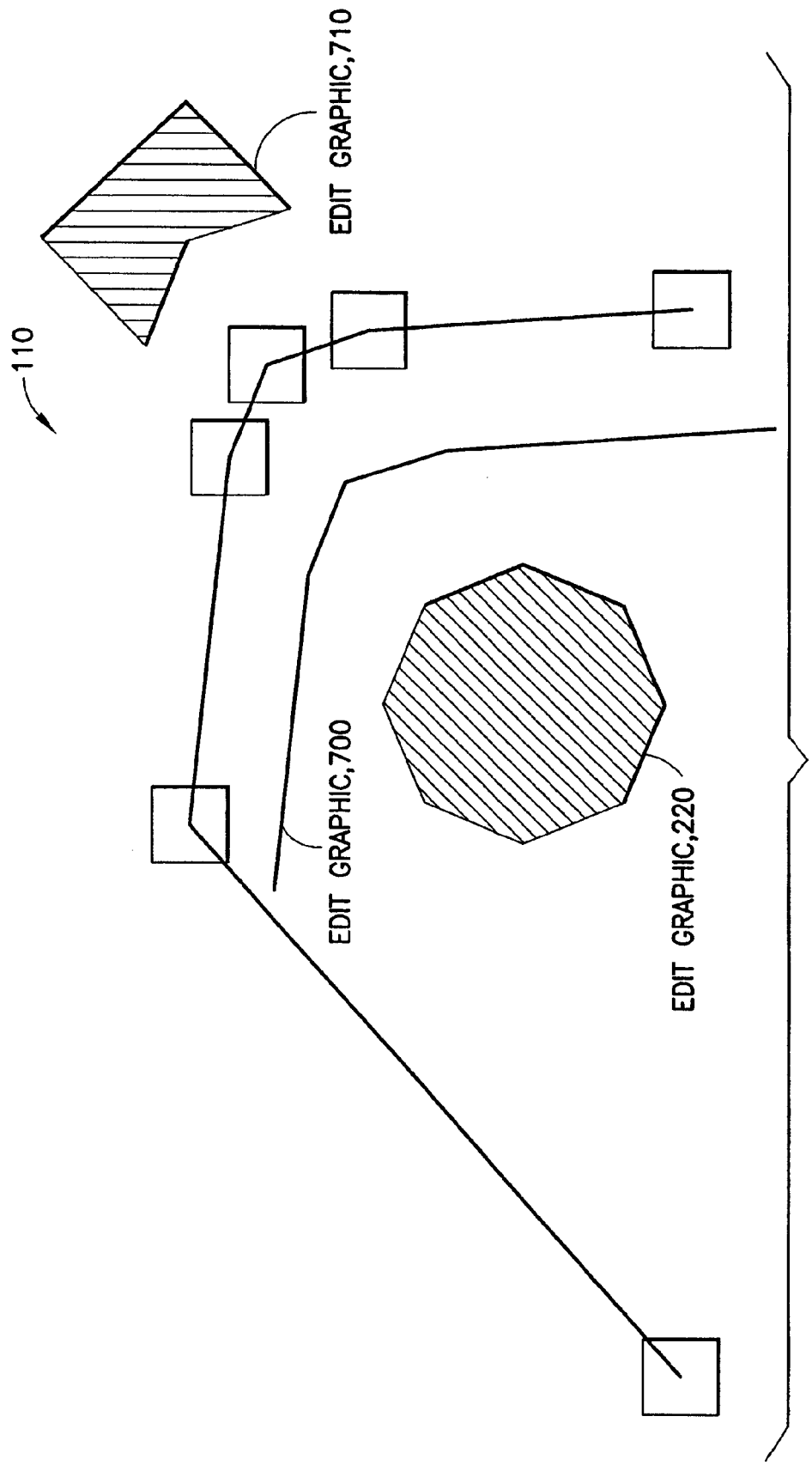
FIG. 7 shows an example of a graph displayed on a display device 110 (Example 6).

FIG. 7 shows an example of a graphic displayed on the display device 110 (Example 6). The edit graphic display unit 120 may display a graphic containing at least one of a plurality of line graphics divided by the edit object dividing unit 140 as an edit graphic 700 serving as a new edit graphic. In this case, the edit graphic moving unit 125 moves the edit graphic 700 on the screen in accordance with a user operation. Accordingly, it is possible to easily create an edit graphic having a shape which is desired by a user.

In response to a user instruction, the edit graphic display unit 120 may further display another edit graphic having a concave shape corresponding to a convex shape formed when the edit graphic 220 contacts a line graphic, or having a convex shape corresponding to a concave shape formed when the edit graphic 220 contacts the line graphic. For example, the edit graphic display unit 120 displays an edit graphic 710 as another edit graphic corresponding to the edit graphic 220. A user can easily make a fine adjustment to the position of a fixed line graphic by using this edit graphic.

Figure 8:
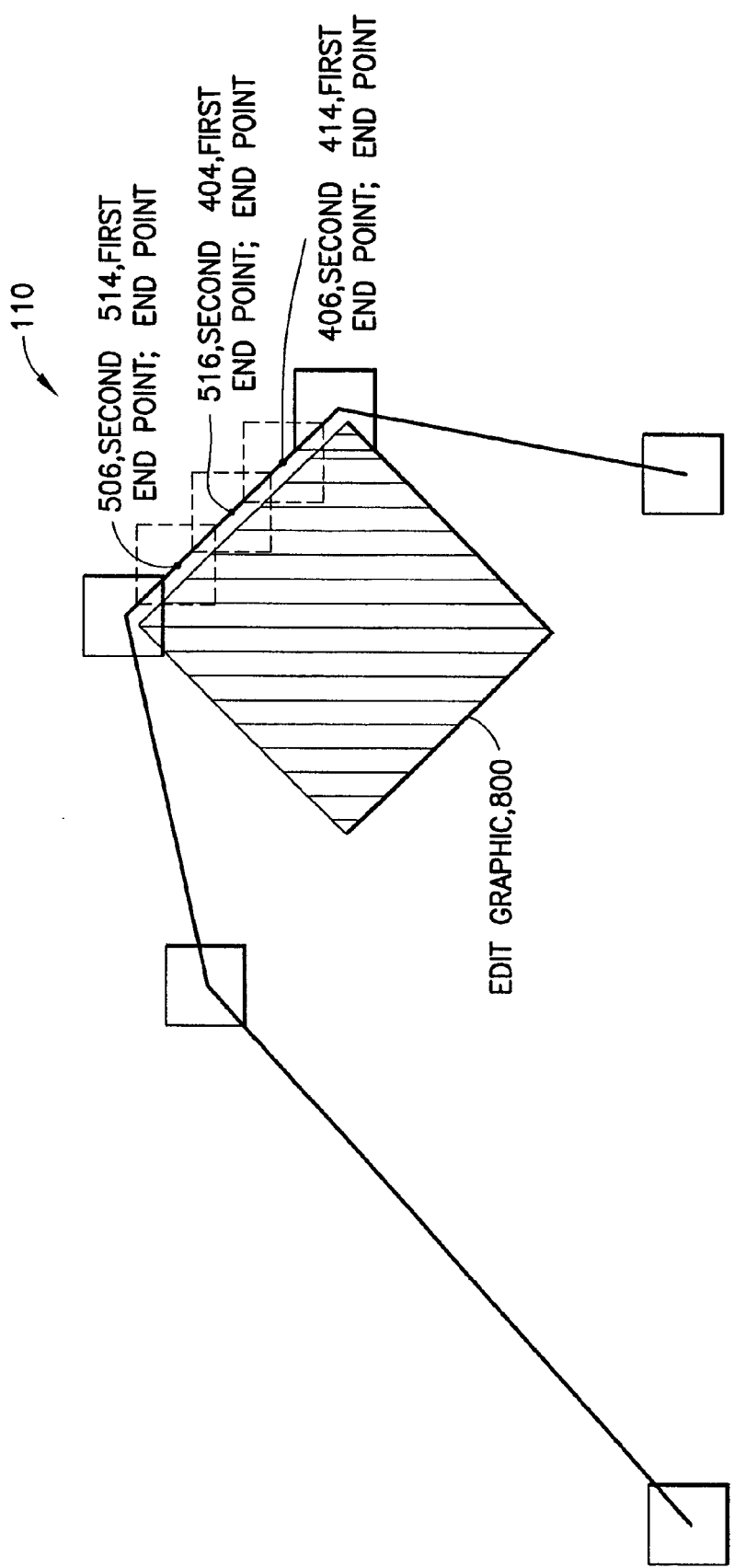
FIG. 8 shows an example of a graph displayed on a display device 110 (Example 7).

FIG. 8 shows an example of a graphic displayed on the display device 110 (Example 7). Referring to the exemplary drawing, the edit graphic display unit 120 displays an edit graphic 800 as still another edit graphic in accordance with a user instruction. The edit graphic moving unit 125 moves the edit graphic 800 in accordance with a user operation. As with the edit graphic 220, whenever a vertex of the edit graphic 800 contacts a line graphic, the edit object dividing unit 140 divides the line graphic contacting the edit graphic into a new line graphic connecting a first end point of the line graphic to a contact point on the line graphic, which contacts the vertex, and a new line graphic connecting the contact point to a second end point of the line graphic.

When the edit graphic 800 is further moved in a direction of the line graphic contacting the edit graphic 800, the edit object moving unit 160 moves an end point of the line graphic, which contacts the edit graphic 800 in accordance with the movement of the edit graphic 800. Consequently, when a side of the edit graphic 800 which is a polygon contacts an end point shared by two line graphics, the edit object dividing unit 140 eliminates the end point. Accordingly, the edit object dividing unit 140 can combine the two line graphics to generate a single line graphic. Specifically, the edit object dividing unit 140 eliminates the second end point 506 and first end point 514, the second end point 516 and first end point 404, and the second end point 406 and first end point 414. In this way, according to the editing apparatus 10 of the present embodiment, unnecessary end points on a straight line can be automatically eliminated.

FIG. 9 shows an example of a graphic displayed on the display device 110 (Example 8). Using the drawing, a process for a case where an edit graphic smoothly traces a line graphic to be edited will be described below. As shown in (a), the edit object display unit 100 displays line graphics 910 and 920 as a graphic to be edited. The edit graphic display unit 120 displays an edit graphic 900 which contacts an end point shared by the line graphics 910 and 920. The edit graphic moving unit 125 moves the edit graphic 900 on the screen of the display device 110 according to a user operation.

As shown in (b), when the edit graphic 900 is moved in a direction such that the edit graphic 900 crosses both of two line graphics obtained by extending the line graphics 910 and 920, the edit object moving unit 160 moves the end point shared by the line graphics 910 and 920 in accordance with the movement of the edit graphic 900. On the other hand, as shown in (c), when the edit graphic 900 is moved in a direction such that the edit graphic 900 crosses only one of two line graphics obtained by extending the line graphics 910 and 920, the edit object dividing unit 140 divides the line graphic 910 crossed by the edit graphic 900. Specifically, the edit object dividing unit 140 divides the line graphic 910 into a line graphic 930 connecting a first end point of the line graphic 910 to a vertex of the edit graphic 900, which crosses the line graphic 910, and a line graphic 940 connecting the vertex to a second end point of the line graphic 910.

When the edit graphic 900 is moved in a direction such that the edit graphic 900 crosses only one of two line graphics obtained by extending the line graphics, the edit object dividing unit 140 preferably divides the line graphic 910 crossed by the edit graphic 900 under an additional condition that the amount of movement of the edit graphic 900 exceeds a predetermined reference amount of movement. If the amount of movement of the edit graphic 900 is smaller than the reference amount of movement, then the edit object dividing unit 140 does not divide the line graphic 910. In this case, if the speed of movement of the edit graphic 900 is larger, the edit object dividing unit 140 may set the reference amount of movement to a larger value compared to when the speed of movement is smaller. Accordingly, it is possible to avoid the generation of numerous shorter line graphics.

As described above with reference to the drawing, if the edit graphic 900 smoothly traces a graphic to be edited, the edit object dividing unit 140 can divide the line graphic in accordance with the trace of movement of the edit graphic 900.

FIG. 10 shows an example of a graphic displayed on the display device 110 (Example 9). In this example, the edit graphic display unit 120 displays a pointer 1000 for specifying a position on the screen of the display device 110 instead of the edit graphic 900. An example of the pointer 1000 is a mouse cursor or a mouse pointer, etc. The tip of the arrow of the pointer 1000 specifies a position on the screen.

As shown in (a), firstly, the edit object dividing unit 140 divides, in response that the pointer 1000 specifies a point on a line graphic, the line graphic into a new line graphic connecting a first end point of the line graphic to the specified point and a new line graphic connecting the specified point to a second end point of the line graphic. The resulting two line graphics are defined as a line graphic 1010 and a line graphic 1020. Then, as shown in (b), when the pointer 1000 is moved in a direction such that the pointer 1000 crosses both of two line graphics obtained by extending the line graphics 1010 and 1020, the edit object moving unit 160 moves an end point shared by the line graphics 1010 and 1020 in accordance with the movement of the pointer 1000.

On the other hand, as shown in (c), when the pointer 1000 is moved in a direction such that the pointer 1000 crosses only one of two line graphics obtained by extending the divided line graphics, the edit object dividing unit 140 divides the line graphic 1010 crossed by the pointer 1000. Specifically, the edit object dividing unit 140 divides the line graphic 1010 into a line graphic 1030 connecting a first end point of the line graphic 1010 to the point specified by the pointer 1000 and a line graphic 1040 connecting the point specified by the pointer 1000 to a second end point of the line graphic 1010. In this way, according to the example shown in the drawing, a user can edit a graphic by use of an ordinary mouse pointer without displaying an edit graphic.

Figures 11A, 11B, 11C:
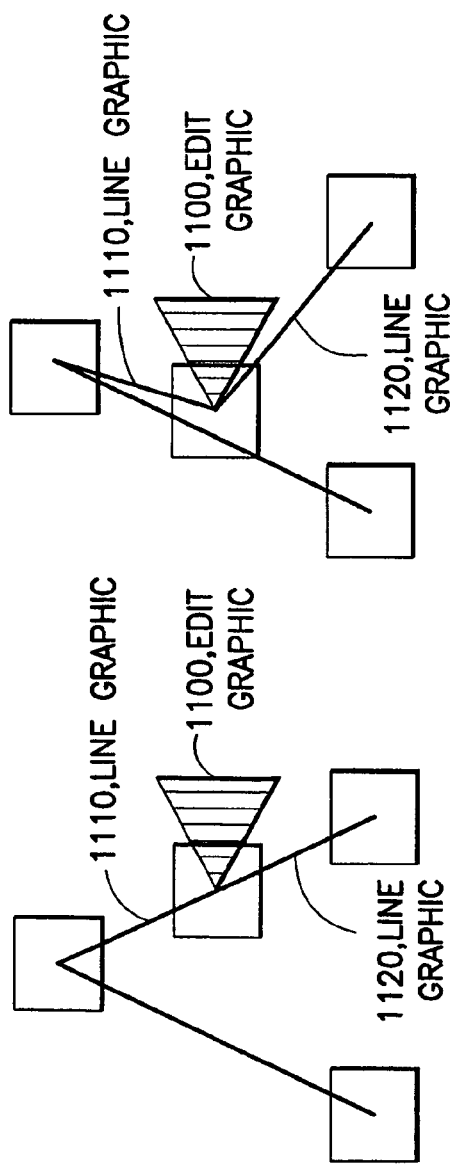
FIG. 11 shows an example of a graph displayed on a display device 110 (Example 10).

FIG. 11 shows an example of a graphic displayed on the display device 110 (Example 10). As shown in (a), when a moved line graphic 1100 contacts a line graphic, the edit object dividing unit 140 divides the line graphic contacting the edit graphic 1100 into a line graphic 1110 and a line graphic 1120. Then, as shown in (b), when the edit graphic 1100 is further moved in a direction of the line graphic which contacts the edit graphic 1100, the edit object moving unit 160 moves an end point of the line graphic, which contacts the edit graphic 1100 in accordance with the movement of the edit graphic 1100.

Furthermore, as shown in (c), when the end point moved by the edit object moving unit 160 contacts a line graphic and the line graphic having the moved end point overlaps with a line graphic which contacts the end point, the edit object dividing unit 140 eliminates an overlapping portion of the two overlapping line graphics. In this way, a user can easily eliminate a line graphic by moving the edit graphic 1100.

Figure 12B:
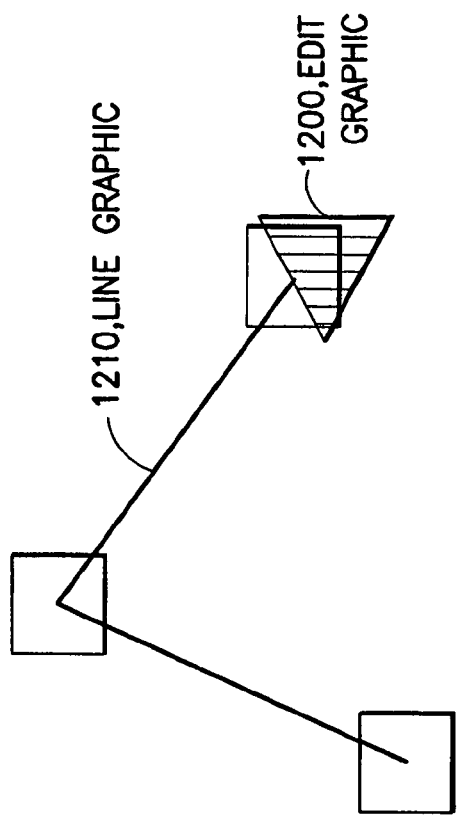
FIG. 12 shows an example of a graph displayed on a display device 110 (Example 11).
Figure 12A:
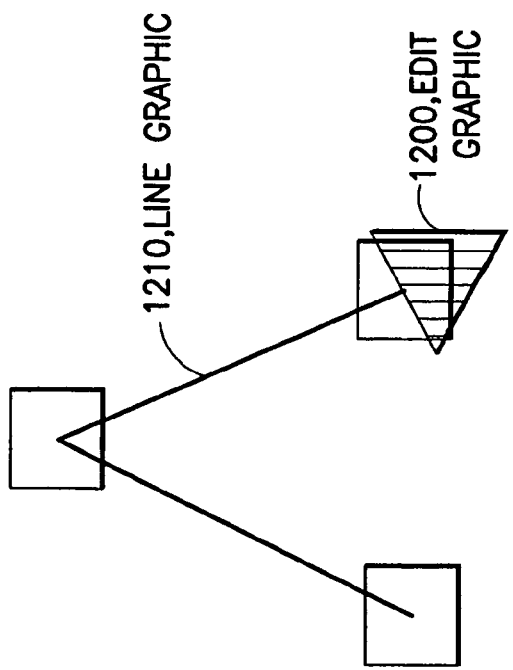

FIG. 12 shows an example of a graphic displayed on the display device 110 (Example 11). As shown in (a), the edit object display unit 100 displays a line graphic 1210 as a graphic to be edited. The edit graphic display unit 120 displays an edit graphic 1200 with a side of the edit graphic 1200 contacting an end point of any one of line graphics. As shown in (b), when the side of the edit graphic 1200 is further moved in a direction of the end point contacting the side, the edit object moving unit 160 moves the end point in accordance with the movement of a contact point on the side while the contact point remains in contact with the end point. In this way, a user can also move an end point by use of the edit graphic 1200.

Figure 13:
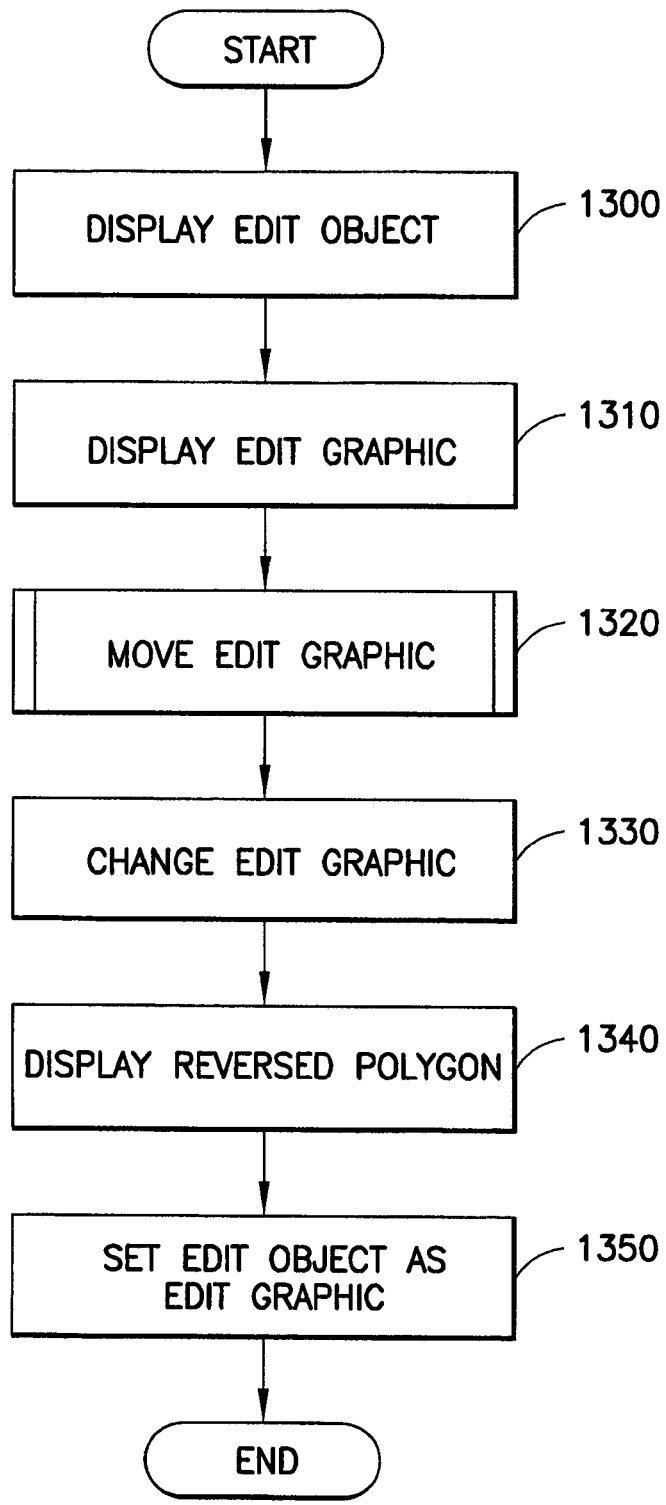
FIG. 13 is an operational flowchart showing an exemplary process in which a graphic is edited by the editing apparatus 10.

FIG. 13 is an operational flowchart showing an exemplary process in which a graphic is edited by the editing apparatus 10. The editing apparatus 10 repeats the following process whenever the apparatus is operated by a user for some purpose, for example. The edit object display unit 100 displays one or more line graphics as a graphic to be edited on the screen (1300). Next, the edit graphic display unit 120 displays an edit graphic used to divide the displayed line graphic into a plurality of line graphics on the screen (1310).

The edit graphic moving unit 125 moves the edit graphic on the screen in accordance with a user operation (1320). Based on this movement process, the edit object dividing unit 140 divides the line graphic, and the edit object moving unit 160 moves the line graphic. Detailed descriptions of the process will be given later. Then, the edit graphic changing unit 170 may change the size or shape of the edit graphic in response to a user instruction, and cause the edit graphic display unit 120 to display the resulting edit graphic (1330). Accordingly, a user can freely set an edit graphic according to an object of editing.

In response to a user instruction, the edit graphic display unit 120 may further display another edit graphic having a concave shape corresponding to a convex shape included in the edit graphic contacting a line graphic, or having a convex shape corresponding to a concave shape included in the edit graphic contacting the line graphic (1340). Furthermore, in response to a user instruction, the edit graphic display unit 120 may display a graphic including at least one of a plurality of line graphics divided by the edit object dividing unit 140 as a new edit graphic (1350).

Figure 14:
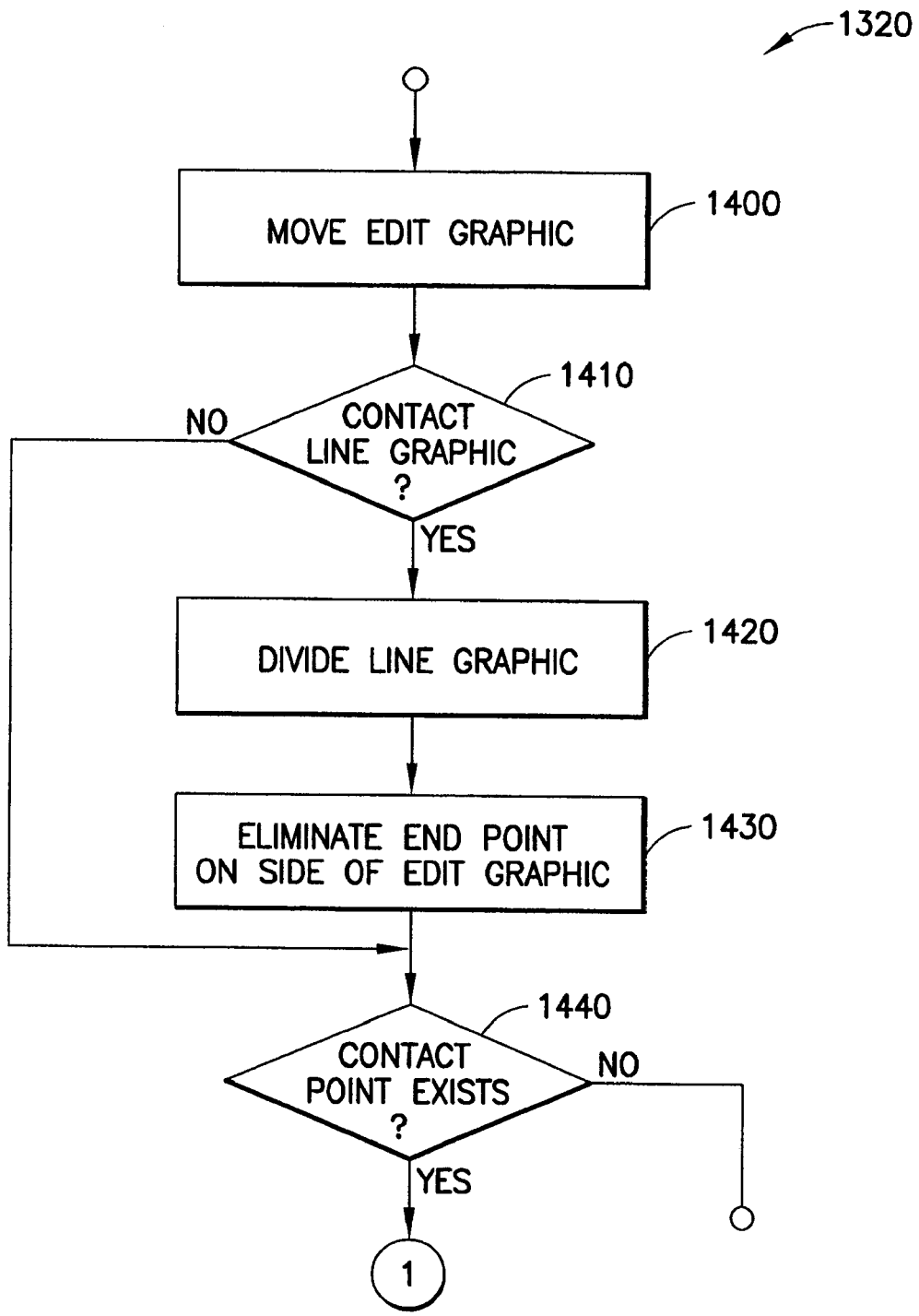
FIG. 14 is an operational flowchart showing the details of the process 1320 shown in FIG. 13.

FIG. 14 is an operational flowchart showing the details of the process 1320 shown in FIG. 13. The edit graphic moving unit 125 moves the edit graphic on the screen in accordance with a user operation (1400). Then, when the moved edit graphic newly contacts a line graphic (1410:YES), the edit object dividing unit 140 divides the line graphic contacting the edit graphic into a new line graphic connecting a first end point of the line graphic to a contact point on the line graphic and a new line graphic connecting the contact point to a second end point of the line graphic (1420). Furthermore, when a side of the edit graphic contacts an end point shared by the two line graphics, the edit object dividing unit 140 eliminates the end point by combining the two line graphics (1430).

When the edit graphic does not contact a line graphic (1440:NO), the edit apparatus 10 terminates the process. On the other hand, when the edit graphic contacts a line graphic, the flow of the editing apparatus 10 proceeds to a process shown in FIG. 15.

Figure 15:
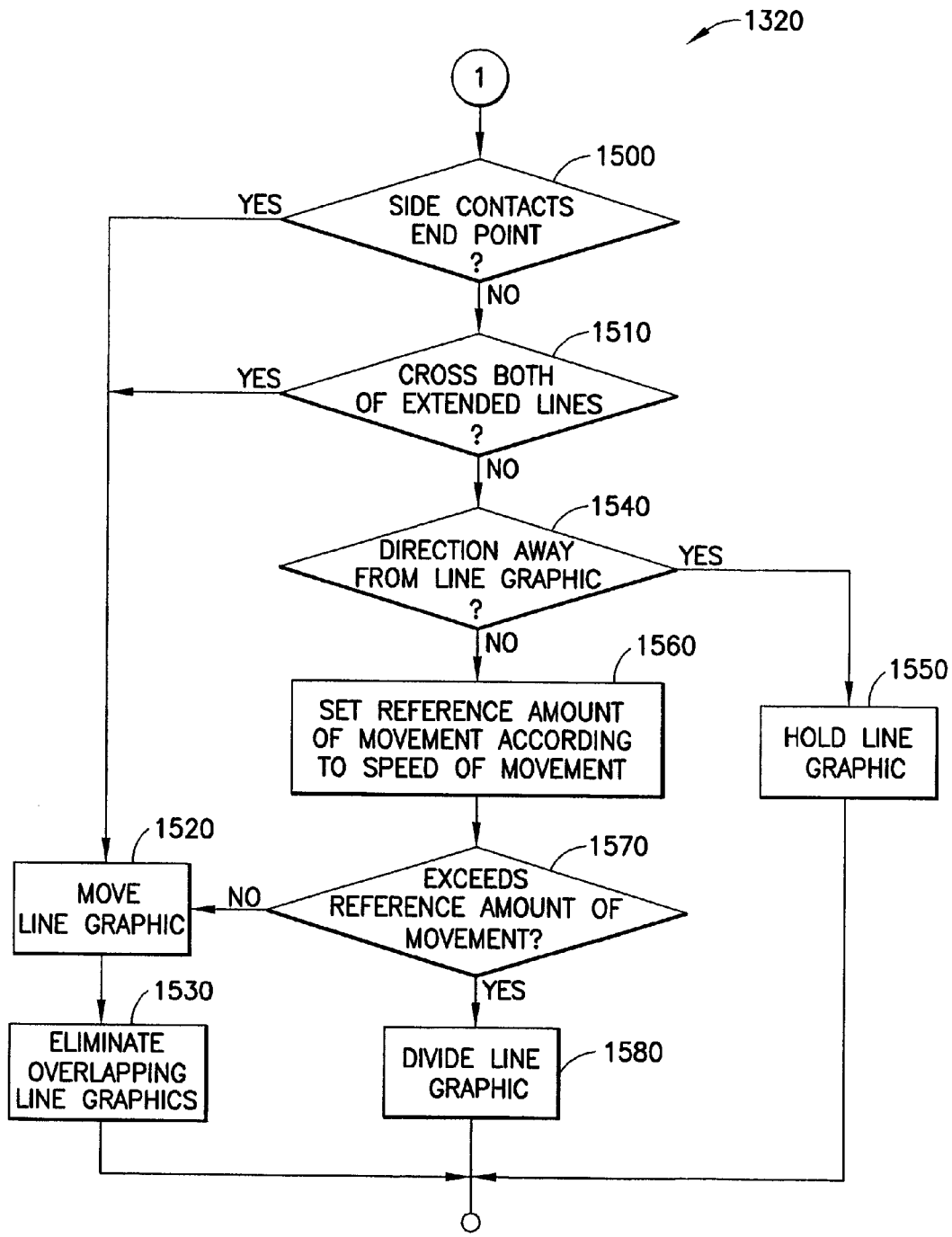
FIG. 15 is an operational flowchart showing the details of a process succeeding the one shown in FIG. 14.

FIG. 15 is an operational flowchart showing the details of a process succeeding the one shown in FIG. 14. In this drawing, a description will be given of a process performed when the edit graphic contacts the line graphic at a single contact point. When there are a plurality of contact points, the process shown in this drawing may be repeated for each contact point. Firstly, when a side of the edit graphic contacts an end point of any one of line graphics (1500:YES), the edit object moving unit 160 moves the end point contacting the edit graphic (1520).

On the other hand, on condition that the edit graphic contacts an end point shared by two line graphics (1500:NO), the edit object moving unit 160 decides whether the edit graphic is moved in a direction of the two line graphics (1510). Specifically, the edit object moving unit 160 decides whether the edit graphic is moved in a direction such that the edit graphic crosses both of line graphics obtained by extending the two line graphics. If so (1510:YES), then the edit object moving unit 160 moves the end point shared by the two line graphics in accordance with the movement of the edit graphic (1520). In this case, when the moved end point overlaps with another line graphic, the edit object dividing unit 140 may eliminate an overlapping portion of the line graphics (1530).

On the other hand, when the edit graphic is moved in a direction such that the edit graphic does not cross at least one of the extended line graphics (1510:NO), the edit object moving unit 160 decides whether the edit graphic is moved in a direction such that the edit graphic is away from the line graphic contacting the edit graphic (1540). If so (1540:YES), the edit object moving unit 160 holds the end point contacting the edit graphic without moving the end point (1550). If the edit graphic is not moved in a direction such that the edit graphic is away from the line graphic (1540:NO), this means that the edit graphic is moved in a direction such that the edit graphic crosses only one of line graphics obtained by extending the two line graphics above described.

In this case, firstly, the edit object dividing unit 140 sets a reference amount of movement according to the speed of movement of the edit graphic (1560). Specifically, when the speed of movement of the edit graphic is larger, the edit object dividing unit 140 sets the reference amount of movement to a larger value compared to when the speed of movement is smaller. Then, the edit object dividing unit 140 decides whether the amount of movement of the edit graphic exceeds the reference amount of movement (1570). The amount of movement herein refers to a distance from a position displayed at the time of the previous operation to a destination to which the edit graphic is moved by the current operation. Alternatively, the amount of movement may refer to an accumulated amount of movement or a distance obtained when the edit graphic is moved during a period of time taken from the previous operation to the current operation.

When the amount of movement does not exceed the reference amount of movement (1570:NO), the flow of the editing apparatus 10 proceeds to 1520 to move the line graphic on the screen. On the other hand, when the amount of movement exceeds the reference amount of movement (1570:YES), the edit object dividing unit 140 divides the line graphic crossed by the edit graphic into a new line graphic connecting a first end point of the line graphic to a vertex of the edit graphic, which crosses the line graphic, and a new line graphic connecting the vertex to a second end point of the line graphic (1580).

Figure 16:
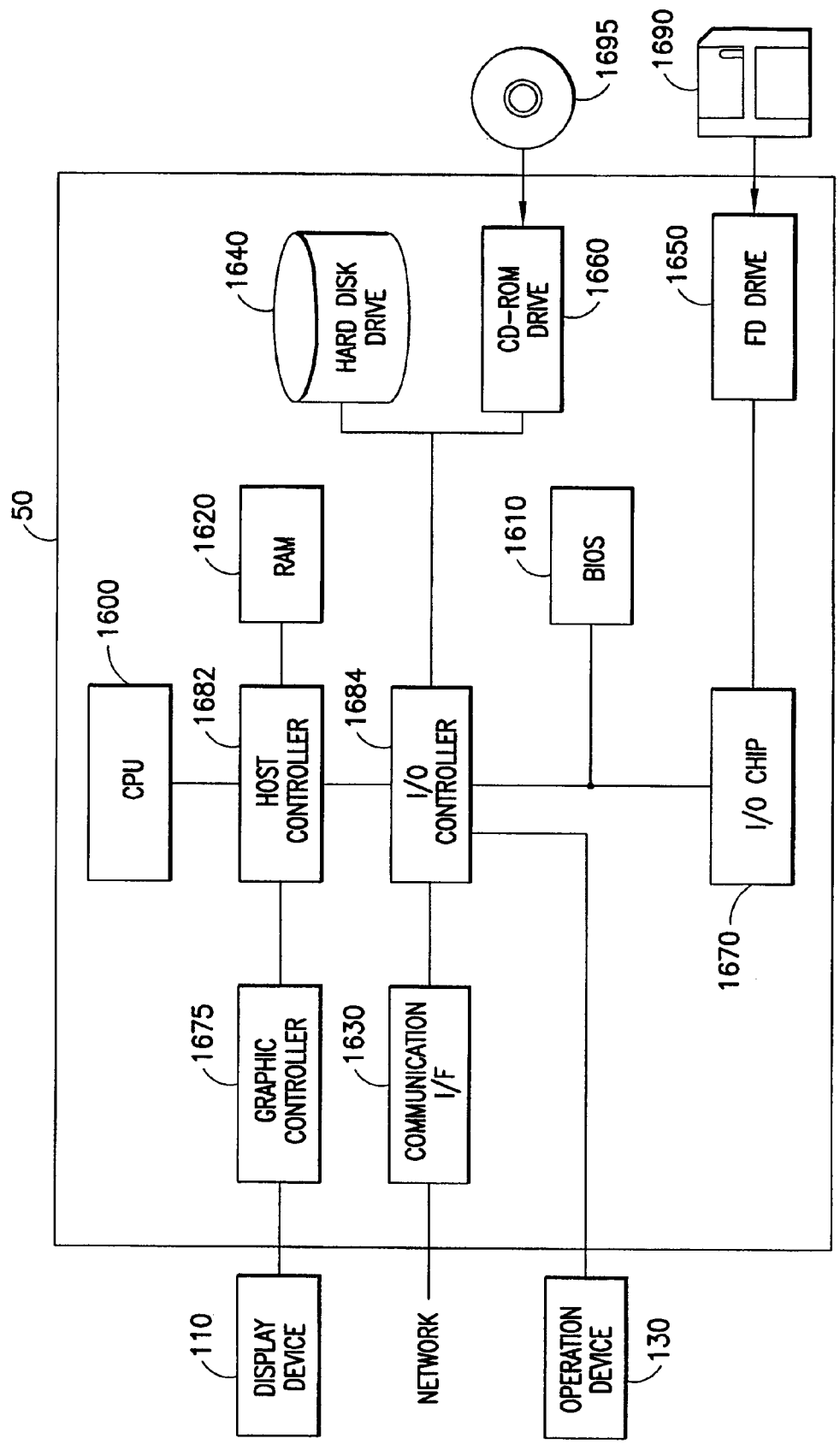
FIG. 16 shows an exemplary hardware configuration of a computer 50 which functions as the main body of the editing apparatus 11.

FIG. 16 illustrates an exemplary hardware configuration of a computer 50 which functions as the main body of the editing apparatus 11. The computer 50 includes: a CPU 1600 and a RAM 1620, connected to each other by a host controller 1682; a peripheral unit having a graphic controller 1675; a communication interface 1630 connected to the host controller 1682 through an input/output controller 1684; an input/output unit having a hard disk drive 1640 and a CD-ROM drive 1660; a BIOS 1610 connected to the input/output controller 1684; a flexible disk drive 1650; a legacy input/output unit having an input/output chip 1670.

Connected to the host controller 1682 are the RAM 1620, the CPU 1600 which accesses the RAM 1620 at high transfer rate and the graphic controller 1675. The CPU 1600 operates according to programs stored in the BIOS 1610 and RAM 1620, thereby controlling each of the units. The graphic controller 1675 acquires image data which the CPU 1600, etc. generates on a frame buffer provided in the RAM 1620, and displays the image data on a display device 110. Alternatively, the graphic controller 1675 may include the frame buffer into which image data generated by the CPU 1600, etc. is stored.

Connected to the input/output controller 1684 are the host controller 1682, the communication interface 1630 serving as a relatively high-speed input/output device, an operation device 130, the hard disk drive 1640 and the CD-ROM drive 1660. The communication interface 1630 communicates with the outside devices via a network. In response to a user operation, the operation device 130 writes information indicating the operational contents into the RAM 1620. The hard disk drive 1640 stores programs and data used by the computer 50. The CD-ROM drive 1660 reads programs or data from a CD-ROM 1695, and provides the programs or data for the input/output chip 1670 via the RAM 1620.

In addition, connected to the input/output controller 1684 are the BIOS 1610 and relatively low-speed input/output devices such as the flexible disk drive 1650 and input/output chip 1670. Stored into the BIOS 1610 are programs including a boot program which the CPU 1600 executes during the startup of the computer 50 and a program dependent on the hardware of the computer 50. The flexible disk drive 1650 reads programs or data from a flexible disk 1690, and supplies the programs or data for the input/output chip 1670 via the RAM 1620. Connected to the input/output chip 1670 are the flexible disk 1690 and various other input/output devices via, for example, a parallel port, a serial port, a keyboard port, a mouse port or the like.

A user supplies a program to be provided for the computer 50 by means of storing the program into the flexible disk 1690, the CD-ROM 1695 or other recording media such as an IC card. The program is read out from the recording media via the input/output chip 1670 and/or the input/output controller 1684, and installed into the computer 50 to be executed. Since operations which the program installed into the computer 50 for execution causes the computer 50 to perform are the same as those of the computer 50, which were described with reference to FIGS. 1 to 15, the descriptions of the operations are omitted.

The program described above may be stored into the outside recording media. As the recording media, in addition to the flexible disk 1690 and CD-ROM 1695, an optical recording media such as a DVD and a PD, an opto-magnetic recording media such as anMD, a tape media, a semiconductor memory such as an IC card and the like can be utilized. A recording device such as a hard disk or a RAM provided in a server system which is connected to a dedicated communication network or the Internet may also be used as the recording media so that the computer 50 is supplied with the program via the network.

As described above, according to the editing apparatus 10 of the present embodiment, by pressing a predetermined edit graphic against a graphic to be edited, a graphic to be edited can be transformed into a shape along the periphery of the edit graphic. In other words, a user can easily edit the graphic by means of an intuitive operation similar to when pressing a ruler against an elastic cord. Accordingly, it is possible to easily create a complex shape having a plurality of vertexes and sides and at the same time possible to properly edit a vector data represented as a set of vertexes and sides.

Although the invention was described above with reference to the embodiment, the technical scope of the invention should not be restrictively interpreted by the description of the embodiment. Those skilled in the art will recognize that many modifications or improvements to the embodiment described above are possible. It will be apparent from the appended claims that the embodiments with such modifications or improvements added are also included in the technical scope of the invention.

What is claimed is:

1. An editing apparatus for editing a displayed graphic, comprising:
    an edit object display unit for displaying on a screen a graphic to be edited which includes at least one line graphic defined as a line segment extending from a first end point to a second end point;
    an edit graphic display unit for displaying on the screen an edit graphic used for editing the line graphic;
    an edit graphic moving unit for moving the edit graphic on the screen in accordance with a user operation;
    an edit object dividing unit for dividing, in response to that the edit graphic contacts a line graphic, the line graphic by generating an end point at a contact point; and
    an edit object moving unit for moving, on condition that the edit graphic is further moved in a direction of a line graphic which contacts the edit graphic, an end point of the line graphic, which contacts the edit graphic in accordance with the movement of the edit graphic; and wherein in response to that a user instruction, the edit graphic display unit further displays another edit graphic having a concave shape corresponding to a convex shape included in the edit graphic contacting the line graphic, or having a convex shape corresponding to a concave shape included in the edit graphic contacting the line graphic.

\* \* \* \* \*